(12) United States Patent
Kettler et al.

(10) Patent No.: US 8,950,770 B2
(45) Date of Patent: *Feb. 10, 2015

(54) VEHICLE STEERING HEAD

(71) Applicant: Kettler International, Inc., Virginia Beach, VA (US)

(72) Inventors: Heinz Kettler, Ense-Parsit (DE); Joachim Kettler, Werl (DE); Reinhard Rocholl, Werl (DE)

(73) Assignee: Kettler International, Inc., Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,190

(22) Filed: Jun. 28, 2013

(65) Prior Publication Data

US 2013/0285345 A1 Oct. 31, 2013

Related U.S. Application Data

(63) Continuation of application No. 13/471,006, filed on May 14, 2012, now Pat. No. 8,511,701, which is a continuation of application No. 12/349,009, filed on Jan. 6, 2009, now Pat. No. 8,201,840, which is a (Continued)

(30) Foreign Application Priority Data

Jul. 5, 1999 (DE) .............................. 299 11 652 U

(51) Int. Cl.
*B62D 5/02* (2006.01)
*B62K 21/18* (2006.01)

(Continued)

(52) U.S. Cl.
CPC ................. *B62K 21/00* (2013.01); *B62K 21/18* (2013.01); *B62K 9/00* (2013.01); *B62K 21/10* (2013.01)
USPC .......................................... 280/279; 280/272

(58) Field of Classification Search
USPC .............. 280/89, 271, 272, 279, 282; 74/495; 403/83, 354
See application file for complete search history.

(56) References Cited

U.S. PATENT DOCUMENTS

| 227,746 A | 5/1880 | Fancher |
| 446,181 A | 2/1891 | Brown |

(Continued)

FOREIGN PATENT DOCUMENTS

| CH | 290478 | 8/1953 |
| CH | 314538 | 7/1956 |

(Continued)

OTHER PUBLICATIONS

Hand made drawing p. No. RF12204 on Italtrike letterhead. The drawing has a handwritten date of Jan. 21, 1987.

(Continued)

*Primary Examiner* — Tony Winner
(74) *Attorney, Agent, or Firm* — Greenblum & Bernstein, P.L.C.

(57) ABSTRACT

A vehicle steering head for a tricycle having a frame, the vehicle steering head including a support tube fixed to the frame of the tricycle. An upper bearing support mounted to the support tube. A lower bearing support is non-rotatably mounted to the support tube. A connecting element is mounted to the support tube via the upper and lower bearing supports. A wheel fork is arranged at a lower end of the connecting element. A mudguard is arranged between the wheel fork and the lower bearing support. The steering also includes non-axially movable angularly spaced stop surfaces and movable stop surfaces that can rotate with the connecting element.

59 Claims, 9 Drawing Sheets

Related U.S. Application Data continuation of application No. 11/562,694, filed on Nov. 22, 2006, now Pat. No. 7,487,988, which is a continuation of application No. 10/671,668, filed on Sep. 29, 2003, now Pat. No. 7,156,408, which is a continuation of application No. 10/298,002, filed on Nov. 18, 2002, now Pat. No. 6,799,772, which is a continuation of application No. 10/092,516, filed on Mar. 8, 2002, now abandoned, which is a continuation of application No. 09/584,497, filed on Jun. 1, 2000, now Pat. No. 6,378,884.

(51) Int. Cl.
*B62K 9/00* (2006.01)
*B62K 21/00* (2006.01)
*B62K 21/10* (2006.01)

(56) References Cited

U.S. PATENT DOCUMENTS

| | | |
|---|---|---|
| 565,718 A | 8/1896 | Boardman |
| 576,566 A | 2/1897 | Foehl |
| 577,990 A | 3/1897 | Stegmann |
| 578,186 A | 3/1897 | Arnold |
| 579,664 A | 3/1897 | McConley |
| 582,279 A | 5/1897 | Gold |
| 585,590 A | 6/1897 | Pallen |
| 591,864 A | 10/1897 | Meyer |
| 642,269 A | 1/1900 | Smith |
| 940,783 A | 11/1909 | Buckland |
| 1,279,540 A | 9/1918 | Hams |
| 1,438,042 A | 12/1922 | Kincaid |
| 1,470,441 A | 10/1923 | Green |
| 1,500,480 A | 7/1924 | Zichman |
| 1,610,057 A | 12/1926 | Humphrey |
| 1,998,512 A | 4/1935 | Manton |
| 2,027,522 A | 1/1936 | Eck |
| 2,073,217 A | 3/1937 | Manton |
| 2,246,191 A | 6/1941 | Schmitz |
| 2,415,735 A | 2/1947 | Fastborg |
| 2,944,590 A | 7/1960 | Cooper |
| 3,660,995 A | 5/1972 | Klein, Jr. |
| 3,785,676 A | 1/1974 | Klein, Jr. |
| 3,825,086 A | 7/1974 | Bombardier |
| 3,827,719 A | 8/1974 | Lohr et al. |
| 3,955,828 A | 5/1976 | Boudreau |
| 4,006,915 A | 2/1977 | Parker |
| 4,029,329 A | 6/1977 | Chambers |
| 4,079,957 A | 3/1978 | Blease |
| 4,120,514 A | 10/1978 | Sanders |
| 4,138,131 A | 2/1979 | Sommer |
| 4,261,588 A | 4/1981 | Kassai |
| 4,390,300 A | 6/1983 | Foster |
| D278,325 S | 4/1985 | Nagel |
| 4,608,729 A | 9/1986 | Huang |
| 4,624,470 A | 11/1986 | Love |
| 4,674,761 A | 6/1987 | Kassai |
| 4,714,261 A | 12/1987 | Kassai |
| 4,744,575 A | 5/1988 | Tonelli |
| 4,763,913 A | 8/1988 | Ehrlich |
| 4,887,827 A | 12/1989 | Heggie |
| 5,040,945 A | 8/1991 | Levesque |
| 5,272,936 A | 12/1993 | Nagano |
| 5,279,181 A | 1/1994 | Boudreau |
| 5,291,797 A | 3/1994 | Chi |
| 5,295,553 A | 3/1994 | Morita et al. |
| 5,314,203 A | 5/1994 | Camfield et al. |
| D355,870 S | 2/1995 | Dieudonne |
| 5,501,478 A | 3/1996 | Doan |
| 5,505,493 A | 4/1996 | Camfield et al. |
| 5,573,262 A | 11/1996 | Chi |
| 5,826,935 A | 10/1998 | DeFreitas |
| 5,911,428 A | 6/1999 | Ueda et al. |
| 5,924,713 A | 7/1999 | Li |
| 5,967,538 A | 10/1999 | Callaluca et al. |
| 6,003,890 A | 12/1999 | Inouye |
| 6,082,754 A | 7/2000 | Jeunet et al. |
| 6,170,841 B1 | 1/2001 | Mizuta |
| 6,186,524 B1 | 2/2001 | McQueeny et al. |
| 6,378,884 B1 | 4/2002 | Kettler et al. |
| 6,644,676 B2 | 11/2003 | Wu |
| 6,793,231 B2 | 9/2004 | Wu |
| 6,799,772 B2 | 10/2004 | Kettler et al. |
| 7,156,408 B2 | 1/2007 | Kettler et al. |
| 7,487,988 B2 | 2/2009 | Kettler et al. |
| 2008/0296864 A1 | 12/2008 | Hutson |

FOREIGN PATENT DOCUMENTS

| | | |
|---|---|---|
| CN | 2033378 | 3/1989 |
| CN | 2272402 | 1/1998 |
| CN | 2306938 | 2/1999 |
| DE | 892 722 | 10/1953 |
| DE | 32 42 863 | 11/1982 |
| DE | 39 14 050 | 4/1989 |
| DE | 298 22 875 | 12/1998 |
| DE | 299 01 449 | 7/1999 |
| DE | 299 11 652.2 | 7/1999 |
| DE | 199 62 468 | 12/1999 |
| FR | 2 614 002 | 4/1987 |
| FR | 2 755 419 | 5/1996 |
| GB | 145370 | 1/1920 |
| GB | 815456 | 11/1957 |
| GB | 2 042 910 | 3/1979 |
| GB | 2 129 319 | 11/1982 |
| GB | 2 145 382 | 3/1985 |
| GB | 2 190 635 | 11/1987 |
| GB | 2 283 217 | 3/1995 |
| TW | 348691 | 12/1998 |
| WO | PCT US95/05226 | 5/1995 |
| WO | 95/32118 | 11/1995 |

OTHER PUBLICATIONS

Hand made drawing p. No. RF12206 on Italtrike letterhead. The drawing has a handwritten date of Jan. 21, 1987.

Cover page of Europeo (in color) having p. RF12230 and dated Feb. 1, 1991.

A sheet entitled "Restricted Turning Prior Art" which Radio Flyer alleges to be evidence that the Radio Flyer model No. 77 was released Feb. 19, 1998.

Document showing Radio Flyer model #77 entitled "Restricted Turning Prior Art" asserted by Radio Flyer to be prior art against grandparent US Patent No. 6,799,772 in Civil Action No. 204-CV-614. Papers filed in this litigation can be provided to the Examiner upon request. During litigation, Radio Flyer presented to Applicant two Radio Flyer model #77 trikes and asserted that these trikes were prior art. One trike had an adhesive label with the following text "P.D. 6/99" and another trike had an adhesive label with the text "P.D. 7/98". Applicant has no knowledge with regard to the meaning of "P.D.". Additionally, during litigation, Applicant ordered three Radio Flyer model #77 trikes on ebay from three different individuals. One trike had an adhesive label with the following text "P.D. 1/99", another trike had an adhesive label with the text "P.D. 7/99", and another trike had an adhesive label with the text "P.D. 10/99", Applicant has no knowledge with regard to whether or when any of these five trikes were sold or offered for sale in the U.S.

Italtrike "Kids on wheels" catalog (in color) pp. KET2818-KET2841 dated Jan. 2005.

Italtrike International "Kids on wheels" catalog (in color) pp. I00004-I00027 dated Jan. 2000.

Radio Flyer catalog (in color) entitled "Specialty Collection Catalog 1999" pp. RF01350-RF01357.

Document produced in during a litigation involving Kettler and appearing to be an Article entitled "Made for Children, Fit for Parents" dated Sep. 22, 2002 identified as ITAL000250-ITAL000251.

Document produced in during a litigation involving Kettler and appearing to show an Italtrike catalog dated Oct. 2009 identified as ITAL000469-ITAL000496.

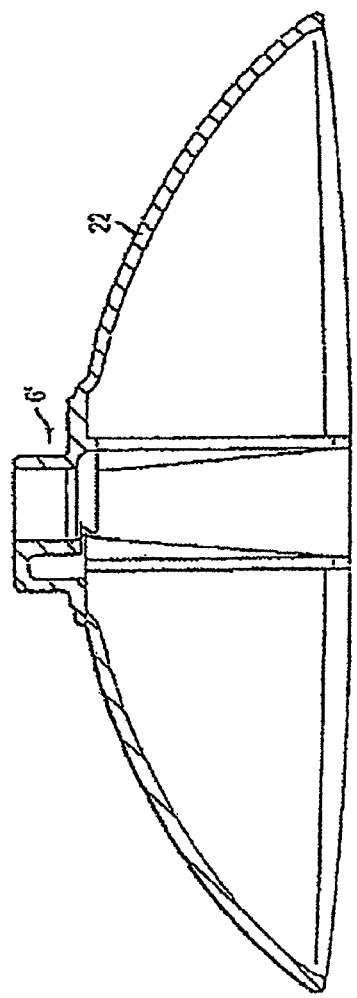
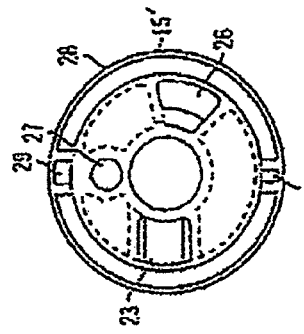
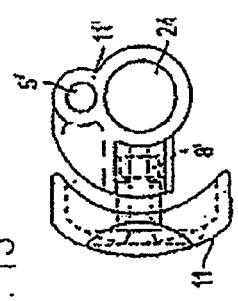
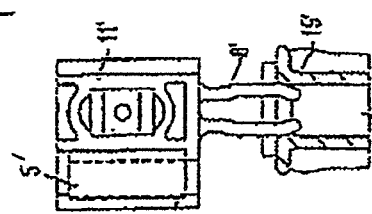
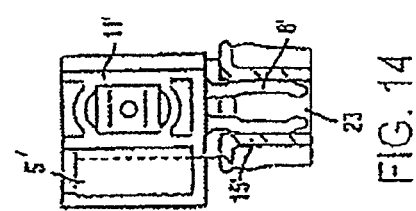
FIG. 13
FIG. 16
FIG. 17
FIG. 15
FIG. 14

VEHICLE STEERING HEAD

CROSS-REFERENCE TO RELATED APPLICATIONS

The present application is a continuation of U.S. application Ser. No. 13/471,006 filed on May 14, 2012, which is a continuation of U.S. application Ser. No. 12/349,009 which was filed on Jan. 6, 2009 and which issued as U.S. Pat. No. 8,201,840, which is a continuation of U.S. application Ser. No. 11/562,694 which was filed Nov. 22, 2006 and which issued as U.S. Pat. No. 7,487,988 on Feb. 10, 2009, which is a continuation of U.S. application Ser. No. 10/671,668 which was filed Sep. 29, 2003 and which issued as U.S. Pat. No. 7,156,408, which is a continuation of U.S. application Ser. No. 10/298,002, which was filed Nov. 18, 2002, now U.S. Pat. No. 6,799,772, which is a continuation of U.S. application Ser. No. 10/092,516 filed Mar. 8, 2002, now abandoned, which is a continuation of U.S. application Ser. No. 09/584,497 filed Jun. 1, 2000, now U.S. Pat. No. 6,378,884, the disclosures of which are expressly incorporated by reference herein in their entireties. Further, the present application claims priority under 35 U.S.C. §119 of German Patent Application No. 299 11 652.2, filed on Jul. 5, 1999, the disclosure of which is expressly incorporated by reference herein in its entirety.

BACKGROUND OF THE INVENTION

1. Field of the Invention

The present invention relates to a vehicle steering head and in particular, to a steering head for a vehicle comprising a support tube which has rotatably supported therein a fork member to which a wheel cover and a handlebar can be secured.

2. Discussion of Background Information

Vehicle steering heads of the above-described type are in particular used in bicycles or tricycles, and in particular in tricycles or bicycles for children.

In devices of the above-described type it is desirable for safety reasons that accidents be avoided which may be caused by an excessively large handlebar deflection. It has been found that when there is an excessively large handlebar deflection (e.g., the handle bar rotates beyond a point where effective steering occurs), the vehicle may tilt to the side. Moreover, such deflections or excessive rotation may run the risk that a user impacts his body against the handlebar. Additionally, the user may get caught with his/her feet in the front wheel and may be even be injured by the pedals.

A further drawback or disadvantage of prior-art devices occurs when they are pushed with a push rod type device. In such cases, these devices have a tendency towards uncontrolled steering movements of the front wheel which cannot be mastered or effectively controlled by small children, in particular.

SUMMARY OF THE INVENTION

The present invention therefore provides a vehicle steering head of the above-mentioned type which is of a simple construction and which can operate in an easy and reliable manner. Moreover, this design avoids the drawbacks of the prior art and can in particular limit a handlebar deflection to a desired degree. The invention also has provision for locking the handlebar.

According to one aspect of the invention a latch element is secured to a fork member on a portion provided inside the support tube. A linkage element is supported in the support tube for rotation therewith. The linkage element is displaceable or moveable in a longitudinal direction of the support tube. The linkage element comprises at least one stop surface which limits a rotation of the fork member and can be brought into contact with the latch element. Moreover, the linkage element comprises at least one locking element which is releasably connectable to the latch element.

According to another aspect of the invention a latch element is supported on the support tube. A linkage element is arranged on the fork member and connected to the tube for rotation therewith. The latch element is freely displaceable or moveable along the support tube. The linkage element comprises at least one stop surface which limits a rotation of the fork member and can be brought into contact with the support tube. Moreover, at least one latch element is provided that is releasably connectable to the support tube.

The vehicle steering head according to the invention is characterized by a number of considerable advantages.

First of all, it is possible to install or utilize the steering head in a frame of any desired design, e.g. children's bicycles or tricycles. Ideally, the dimensions of the steering head are such that they do not interfere with the remaining structure of the frame within which it is installed. Of course, the steering head may be combined with any and all common types of frames where ever its advantageous design is desired. Accordingly, the steering head may be utilized in a variety of devices where limited deflection or rotation and/or locking are desired.

Because the invention utilizes a latch element which is arranged in the support tube, no functional parts of the steering head need be outwardly visible or accessible. Accordingly, the internal parts are less susceptible to damage. Additionally, this design is less likely to cause injury when used by children or infants.

As a result of utilizing a linkage element according to the invention, it is possible to reliably lock the fork member and thus the wheel fork and the front wheel. Such a locking provision is easily be accomplished by displacing or moving the linkage element. This design ensures a high degree of operational safety and operational reliability.

The linkage element preferably utilizes stop surfaces which cooperate with the latch element in a manner where they are brought into contact with one another. In this way, the steering angle can be limited to a particularly or desired range. This limited range of motion of the steering angle can be realized according to the invention in different ways. The invention contemplates that the available steering angle is freely selectable within a wide desired range. This is of particular advantage to vehicles for children such as tricycles, which may require a steering angle of approximately 45° to each side. Of course, other desirable steering angles can be utilized. However, by designing in the desired limited steering angle, lateral tilting of the tricycle or similar devices can be prevented or their risk significantly reduced. Additionally, the risk of injuries which may be caused by the pedals, e.g., devices which utilize pedals on the front wheel can be reduced. Finally, the risk of injury which can occur when the handlebar exceeds a controlled steering angle can be ruled out to a considerable extent.

The invention also provides for a linkage element having a locking element which is releasably connectable to the latch element. This design ensures that when a push rod is used for pushing the device, i.e., a tricycle, the front wheel thereof may be reliably locked in place during straight travel.

In an advantageous embodiment of the invention, the latch element is designed in the form of a pin which extends in a direction transverse to the fork member. The pin may extend through the fork member such that it projects at both sides of the fork member. Alternatively, the pin can project from the fork member on only one side. Moreover, the pin can be firmly connected to the fork member, e.g. by welding or other conventional attachment techniques. Additionally, it may be secured by press fitting with or without utilizing a knurled portion. Of course, the dimensions of the pin can easily be adapted to the respective conditions of use.

It should be noted that the manufacturing costs of the steering head are reduced by the above-described construction to quite a considerable degree.

In another advantageous embodiment of the invention, the linkage element is substantially designed in the form of a hollow cylinder. Thus, the linkage element can be reliably guided in the support tube and surround the fork member. Additionally, the linkage element can be designed as a single integral part or several parts which are either joined together or which cooperate together.

It is advantageous for the longitudinal displacement or movement of the linkage element to be along an axis of the support tube and the fork member. Accordingly, the support tube may comprise at least one longitudinal slot or a similar recess through which a connection element extends which is connected to the linkage element. This design also utilizes a slide which is arranged outside the support tube.

The slide facilitates the ease of handling or movement of the linkage element. In such a design, a displacement of the slide, which may additionally be provided with locking mechanism or fixing safety mechanism, effects a corresponding displacement or movement of the linkage element. The locking mechanism or fixing mechanism allows for fixing the front wheel in a single or set travel position which is preferably straight. Moreover, the invention also contemplates that the linkage element may be provided with inclined inlet surfaces or intercepting mechanisms which engage the latch element so as to initiate a locking action when the front wheel is slightly deflected angularly.

Stop surfaces on the latch element are preferably formed on at least one front attachment of the linkage element. Additionally, it is particularly advantageous when two opposite attachments or stops are in symmetry with each other and are each provided with at least one stop surface located on the linkage element. Thus, by utilizing two attachments or stops which are in symmetry with each other, this design can limit the steering angle in a symmetrical fashion to both the left and the right side.

In another advantageous embodiment of the invention, the associated stop surfaces of the attachments or stops act to limit the rotation of the fork member to a predetermined angular range at both sides. This angular range may e.g. be approximately 45° to both sides, for a total range of motion of approximately 90°.

The locking element is preferably designed in the form of at least one front recess which receives the latch element. Such an advantageous design makes it possible to grip and fix the latch element upon displacement or movement of the linkage element. Additionally, it is advantageous that the recess be retracted or set back relative to the front attachment, so that the attachments or stops can always remain in the plane of the latch element, while upon a displacement of the latch element, it is only the recess which can additionally be brought into engagement.

To implement a simple and operationally reliable structure of the steering head, it may be advantageous for the recess to be centrally arranged between the two attachments or stops.

The invention also contemplates that the fork member itself has not been changed constructionally. In other words, the invention can be adapted to work with a conventional fork member. Also, the invention makes it possible to manufacture all functional parts separately in a very simple manner. As a result, advantageous production costs can be achieved.

In a preferred design of a previously described embodiment, the linkage element is designed as part of a mudguard which extends from below into the support tube. This design allows for significant cost savings since the mudguard is normally made from plastics and is typically already included in most vehicles of the above-described type. The linkage element can thus be mounted on the mudguard or made integrally therewith, in a particularly easy way and at low costs.

A further advantage of the this embodiment is that the latch element can be designed in the form of a bolt which arranged to be parallel with the fork member. The latch element of this design can thus be given relatively large dimensions so that the diameter of the support tube itself need not be chosen with such a large size.

It may be of particular advantage when the latch element is connected to a slide which extends into the support tube so as to be able to design the lock of the front wheel in a particularly simple manner. Furthermore, the locking element may preferably be connected to the slide. Moreover, the locking element serves to reliably maintain the locked state and to prevent any unintended unlocking. The locking element also preferably engages into a recess of a bearing which supports the fork member in the support tube. As a result, it is not necessary to mount additional parts or to take installation measures on the support tube itself.

It may also be of particular advantage for the limitation of the steering angle to be accomplished by a lower bearing which supports the fork member in the support tube. This lower bearing may have formed thereon an attachment which projects in the direction of the linkage element and which can be brought into contact with the stop surfaces formed on the linkage element and thus on the mudguard. This design has the advantageous effect that the predetermined angular range can be limited at both sides as well, e.g. approximately 45° each side.

The invention provides a vehicle steering head including a support tube which rotatably supports therein a fork member to which a wheel fork and a handlebar can be secured, the steering head including a latch element projecting from the fork member and disposed within the support tube, and a linkage element disposed within the support tube, wherein the linkage element is moveable in a direction which is substantially parallel to an axis of the fork member and comprises at least one stop surface for limiting a rotation of the fork member when the latch element contacts the at least one stop surface. The linkage element may further comprise at least one locking element for locking the fork member in a single position. The at least one locking element may releasably engage the latch element when the fork member is locked. The latch element may comprise a pin. The pin may project substantially perpendicular to the axis of the fork member. The linkage element may comprise a substantially cylindrical shape. The linkage element may comprise a plurality of hollow chambers separated by connecting walls. The support tube may comprise an opening which allows a connecting element to pass therethrough. The opening may comprise a longitudinal slot. The connecting element may be secured to the linkage element. The movement of the linkage element may be limited by the movement of the connecting element within the longitudinal slot. The steering head may further comprise a slide which is secured to the connecting element, the slide being disposed adjacent an outer surface of the support tube. The at least one stop surface may be disposed on at least one stop.

The at least one stop may comprise a projection which extends from the linkage element. The at least one stop may comprise a wedge-shaped hollow projection having two angled lateral stop surfaces. The at least one stop may comprise two stops which are disposed opposite one another. Each stop may comprise a wedge-shaped hollow projection having two angled lateral stop surfaces. The two stops may define a limited range of rotational motion of the fork member in each of a clockwise and a counter-clockwise direction. The limited range of motion in the clockwise direction may be substantially equal to the range of motion in the counter-clockwise direction. The limited range of motion in one of the clockwise and counter-clockwise direction may be approximately 45 degrees.

The linkage element may further comprise at least one locking element, the at least one locking element comprising at least one recess which is adapted to receive the latch element. The at least one recess is set back some distance from a surface of at least one stop. The at least one recess is centrally disposed between at least two stops.

The steering head may further comprise an upper bearing disposed on one end of the support tube and a lower bearing disposed on another end of the support tube, each of the upper and lower bearings having an opening which allows the fork member to pass therethrough.

The steering head may be disposed on a tricycle frame.

The invention also provides for a vehicle steering head including a support tube which rotatably supports therein a fork member to which a wheel fork and a handlebar can be secured, the steering head including a latch element disposed within the support tube, the latch element being moveable in a direction which is substantially parallel to an axis of the fork member, and a linkage element connected to the fork member so as to rotate therewith, the linkage element comprising at least one stop surface, wherein the at least one stop surface limits the rotation of the fork member with respect to the support tube. The steering head may further comprise a slide, wherein the slide is disposed within the support tube and retains the latch element. The slide may further comprise at least one locking element for releasably securing the slide to the support tube. The linkage element may comprise a mudguard. The mudguard may be disposed between one end of the support tube and a wheel fork. The latch element may comprise a rod like member which is arranged substantially parallel to the axis of the fork member. The rod like member may comprise one of a bolt and a pin. The latch element may be connected to a slide, the slide being disposed within the support tube. The slide may be moveable substantially parallel to the axis of the fork member. A locking element may be connected to the slide.

The steering head may further comprise a bearing support disposed on at least one end of the support tube. The bearing support may be disposed on a lower end of the support tube. The steering head may further comprise a locking element disposed within the support tube, the locking element being insertable into a recess of the bearing support. The bearing support may comprise at least one stop, the at least one stop comprising at least one surface which engages the linkage element. The at least one stop may comprise a projection which engages a recess in the linkage element. The projection and the recess may cooperate to limit the rotational movement of the fork member within a desired range. The range of the rotational movement may be limited by at least two stop surfaces. The at least two stop surfaces may define a limited range of rotation in one of a clockwise and a counter-clockwise direction. The at least two stop surfaces may define a limited range of rotation in each of a clockwise and a counter-clockwise direction. The limited range of rotation between the at least two stops may be approximately 45 degrees.

The steering head may be disposed on a tricycle frame.

The invention further provides for a vehicle steering head including a support tube and fork member which is rotatably mounted with respect to the support tube, the steering head including an upper bearing support disposed at an upper end of the support tube and a lower bearing support disposed at a lower end of the support tube. The fork member comprises a fork end, a handlebar, and a latch element projecting from the fork member between the fork end and the handlebar end. The latch element is disposed within the support tube and a linkage element is slidably disposed within the support tube. The linkage element comprises at least one stop surface for engaging the latch element, wherein the linkage element is moveable in a direction which is substantially parallel to an axis of the fork member from a first position where the latch element and the at least one stop cooperate to limit the rotational movement of the fork member to a second position where the latch element releasably engages a locking element disposed on the linkage element whereby the fork member is prevented from rotating in any direction. The linkage element may be moveable from outside the support tube via a slide. The slide may be connected to the linkage element via a connection element, the connection element passing through a longitudinal in the support tube. The longitudinal slot may limit the movement of the linkage element.

The invention also relates to a vehicle steering head including a support tube and fork member which is rotatably mounted with respect to the support tube, the steering head including an upper bearing support disposed at an upper end of the support tube and a lower bearing support disposed at a lower end of the support tube. The lower bearing support comprises at least one stop surface, the fork member comprising a fork end, a handlebar, and a latch element which is slidably disposed adjacent the fork member between the fork end and the handlebar end, the latch element being disposed within the support tube and a linkage element moveably disposed adjacent the lower support bearing. The linkage element comprises at least one stop surface for engaging the at least one stop surface of the lower bearing support and comprising a recess for receiving the latch element, wherein the linkage element is moveable in a direction which is substantially parallel to an axis of the fork member from a first position where the latch element engages only the lower bearing support and where the at least one stop of the lower bearing support cooperates with the at least one stop of the linkage element to limit the rotational movement of the fork member to a second position where the latch element releasably engages a recess in the linkage element whereby the fork member is prevented from rotating in any direction. The linkage element may be moveable from outside the support tube via a slide. The slide may be connected to the linkage element via a connection element, the connection element passing through a longitudinal in the support tube. The longitudinal slot may limit the movement of the linkage element. The linkage element may further comprise at least one locking element for engaging a locking recess in the lower bearing support. The at least one locking element engages the locking recess of the lower bearing support when the latch element engages the recess in the linkage element.

The invention provides for a vehicle steering head including a fork member adapted to engage a handlebar, a support tube which rotatably supports the fork member, a latch element disposed within the support tube, and a slide which is moveable with respect to the support tube, wherein the slide is moveable from at least one position wherein linkage element prevents the fork member from rotating with respect to the support tube to at least another position wherein the linkage element allows the fork member to rotate with respect to the support tube in at least two directions. The latch element may comprise a rod-like member.

The invention also provides for a vehicle steering head that includes a support tube adapted to be coupled to a vehicle frame, an upper bearing support arranged at an upper end of the support tube, a lower bearing support arranged at a lower end of the support tube, the lower bearing support comprising at least one stop surface, a cylindrical element rotatably mounted to the support tube via the upper and lower bearing supports, the cylindrical element having one end that is adapted to be connected to a wheel fork and another end that is adapted to be connected to a handlebar, a latch element movably disposed within the support tube, a slide coupled to the latch element, the latch element being movable from outside the support tube, a linkage element that is rotatable with respect to the support tube, and the linkage element cooperating with the lower bearing support to limit a rotational movement of the linkage element with respect to the support tube, wherein the latch element and the linkage element are releasably engagable with each other to prevent rotational movement of the cylindrical element.

The invention also provides for a vehicle steering head comprising a support tube adapted to be fixed to a frame, a fork member adapted to connect a wheel fork to a handlebar, the fork member being rotatable with respect to the support tube, a mechanism which limits the rotational movement of the fork member in each of two directions, and a lower bearing support mounted to the support tube, wherein the mechanism and the lower bearing support cooperate to limit the rotational movement of the fork member.

The lower bearing support may be non-rotatably fixed to the support tube. The lower bearing support may comprise at least one stop surface. The lower bearing support may comprise two stop surfaces. The mechanism may comprise at least one stop surface. The mechanism may comprise two stop surfaces. The mechanism may comprise a linkage element having at least one stop surface. The linkage element may rotate with the fork member. The linkage element may be arranged on a mudguard. The fork member may be cylindrically shaped. The steering head may further comprise a handlebar connected to one end of the fork member and a wheel fork connected to another end of the fork member.

The invention also provides a vehicle steering head comprising a support tube adapted to be fixed to a frame, a cylindrical member adapted to connect a wheel fork to a handlebar, the cylindrical member being rotatable with respect to the support tube, a linkage element being movable and comprising at least two stop surfaces, wherein one of the at least two stop surfaces limits the rotation of the cylindrical member in one direction, and wherein another of the at least two stop surfaces limits the rotation of the cylindrical member in another direction.

The linkage element may rotate with the cylindrical member. The linkage element may rotate with a mudguard.

The invention also provides for a vehicle steering head comprising a support tube adapted to be fixed to a frame, a connecting element adapted to connect a wheel fork to a handlebar, the connecting element being rotatable with respect to the support tube, a linkage element being rotatable and comprising at least two stop surfaces, a mudguard that rotates with the linkage element, one of the at least two stop surfaces limiting the rotation of the connecting element in one direction, and another of the at least two stop surfaces limiting the rotation of the connecting element in another direction.

The invention also provides for a vehicle steering head comprising a support tube adapted to be fixed to a frame, a fork member adapted to connect a wheel fork to a handlebar, the fork member being rotatable with respect to the support tube, and a system which limits the rotational movement of the fork member in each of two directions, wherein the system includes one part which is non-rotatably mounted to the support tube and another part which rotates with the fork member.

The invention also provides for a tricycle with limited steering and steering lock, comprising a support tube fixed to a frame, a connecting member rotatably mounted to the support tube via upper and lower bearing supports, and a mechanism that limits rotational movement of the connecting member in each of two directions. The mechanism comprises at least two stop surfaces. One of the at least two stop surfaces limiting the rotation of the connecting member in one of the two directions. Another of the at least two stop surfaces limiting the rotation of the connecting member in another of the two directions. A mudguard has portions that engage with a wheel fork so as to rotate with the with the wheel fork. A steering lock system is utilized. A button of the steering lock system is arranged on a front side of the support tube and being movable between an unlocked position and a locked position. In the unlocked position, the connecting member being rotatable in each of the two directions, and in the locked position, the connecting member is prevented from rotating in each of the two directions.

The mudguard is a one-piece mudguard, the lower bearing support is non-rotatably mounted to the support tube and a portion of the button extends into a slot arranged on the front side of the support tube.

The button comprises a portion arranged outside the support tube and a portion that extends into an opening of the support tube.

The upper and lower bearing supports each comprise a portion extending outside the support tube and a portion extending inside the support tube.

The mechanism moves when the connecting member moves.

The mechanism comprises a projection and extends into a recess comprising two stop surfaces.

A bottom of the recess is arranged axially above a lower end of the support tube.

The invention also provides for a vehicle steering head for a tricycle having a frame, wherein the vehicle steering head comprises a support tube fixed to the frame of the tricycle, an upper bearing support mounted to the support tube, a lower bearing support non-rotatably mounted to the support tube, a connecting element mounted to the support tube via the upper and lower bearing supports, a wheel fork arranged at a lower end of the connecting element, a mudguard arranged between the wheel fork and the lower bearing support, non-axially movable angularly spaced stop surfaces, movable stop surfaces that are rotatable with the connecting element, one movable stop surface contacting one of the non-movable stop surfaces when the wheel fork is rotated in one direction and another movable stop surface contacting another of the non-movable stop surfaces when the wheel fork is rotated in another direction. The upper and lower bearing supports each comprising a portion extending outside the support tube and a portion extending inside the support tube.

The non-movable stop surfaces are arranged between the mudguard and an upper end of the support tube and between an outer surface of the connecting element and an inner surface of the support tube.

The steering head may further comprise a locking system which, in a locked position, prevents rotational movement of the wheel fork and which, in an unlocked position, allows the wheel fork to rotate within an angular range.

The mudguard may be a one-piece mudguard arranged below the lower bearing support.

The steering head may further comprise a button arranged on a front side of the support tube for activating a steering lock system, wherein the button comprises a portion arranged outside the support tube and a portion that extends into a slot of the support tube.

The lower bearing support comprises the non-movable stop surfaces.

The movable stop surfaces are arranged on a projection.

The projection comprises an upper surface that is arranged within the support tube.

The non-movable stop surfaces are arranged on an arcuate recess.

The movable stop surfaces are arranged on a projection and further comprising a steering lock device having a portion that engages with the projection in a steering lock position and disengages from the projection in a steering unlock position.

In the steering lock position, the portion of the steering lock device moves parallel to an axis of the connecting element and engages with an opening of the projection.

The invention also provides for a vehicle steering head for a tricycle having a frame, wherein the vehicle steering head comprises a support tube fixed to the frame of the tricycle, an upper bearing support mounted to the support tube, a lower bearing support mounted to the support tube, a connecting element mounted to the support tube via the upper and lower bearing supports, angularly spaced non-movable stop surfaces, movable stop surfaces that are rotatable with the connecting element, one movable stop surface contacting one of the non-movable stop surfaces when the connecting element is rotated in one direction and another movable stop surface contacting another of the non-movable stop surfaces when the connecting element is rotated in another direction, whereby steering is limited within an angular range, the upper and lower bearing supports each comprising a portion extending outside the support tube and a portion extending inside the support tube, the lower bearing support comprising a recess and a main central opening receiving therein a portion of the connecting element, and a steering lock system comprising a movable member disposed within the support tube and having a main opening that allows another portion of the connecting element to pass therethrough.

The steering head may further comprise a mudguard arranged below the lower bearing support, wherein: the non-movable stop surfaces are arranged between the mudguard and an upper end of the support tube and between an outer surface of the connecting element and an inner surface of the support tube, the movable stop surfaces comprise lateral stop surfaces arranged on a projection and the steering lock system is placed in a locked position, preventing rotational movement of the connecting element, via movement of a button located on a front side of the support tube.

The invention also provides for a tricycle comprising a hollow support tube coupled to a frame, upper and lower bearing supports respectively coupled to upper and lower ends of the support tube, a fork member having a cylindrical portion extending up through the lower bearing support and into the support tube, a mudguard having a surface structured and arranged to contact a lower surface of the lower bearing support, and a lock element that is movable by a user between a locked position and an unlocked position. Rotational movement is limited in each of two opposite steering directions.

The lock element is a lock button arranged outside the support tube.

The lock element is arranged on a front side of the support tube.

The mudguard is a one-piece mudguard.

The upper and lower bearing supports each have a portion extending within the support tube and a portion arranged outside the support tube.

The mudguard comprises a projecting portion that projects upward relative to the upper surface.

The projecting portion extends into a recess formed in the lower bearing support.

The lock element can slide up and down.

The mudguard comprises a fender portion and lateral projecting portions.

The invention also provides for a tricycle comprising a hollow support coupled to a frame, an upper bearing support arranged at an upper end of the hollow support, a fork member mounting a front wheel. The fork member has a cylindrical portion extending up through the hollow support. An upper end portion of the cylindrical portion extending out of an opening in the upper bearing support. A mudguard has an opening through which passes a portion of the cylindrical portion. A projection that rotates with the fork member about an axis of the cylindrical portion to move towards and away from stop surfaces. A recess located at a lower end of the hollow support to receive therein the projection.

Rotational movement of the front wheel is limited via the projection in each of two opposite steering directions.

The mudguard is a one-piece mudguard and comprises an upper annular surface arranged below a lower end of the hollow support.

The upper bearing support has a portion extending within the hollow support and a portion arranged outside the hollow support.

The recess is an arc-shaped recess.

The mudguard comprises a fender portion and lateral projecting portions.

The invention also provides for a tricycle limited steering system, comprising a steerable front wheel, a hollow support tube coupled to a frame, upper and lower bearing supports respectively coupled to upper and lower ends of the support tube, a member extending through the support tube and having an upper portion extending out through an opening in the upper bearing support and a lower portion extending out through an opening of the lower bearing support, a recess comprising first and second stop surfaces and a projection that extends into the recess. The projection and recess limit steering movement of the front wheel such that the projection and the first stop surface are engagable when the front wheel is steered in a first steering direction, and the projection and the second stop surface are engagable when the front wheel is steered in a second steering direction.

The recess is an arc-shaped recess.

The tricycle may further comprise a surface arranged adjacent a surface of the lower bearing support and a portion of the projection extends into the support tube and another portion of the projection extends outside of the support tube.

The invention also provides for a children's vehicle having limited steering, comprising a hollow support member, a frame having a front end coupled to the hollow support member and a rear end coupled to a rear axle, a seat mounted to the frame between the hollow support member and the rear axle, an upper bearing support having a main through opening and being mounted to an upper end of the hollow support member, a lower bearing support having a main through opening and being mounted to a lower end of the hollow support member, a connection member having a lower end extending to a wheel fork and an upper end connectable to a handlebar. The connection member is rotatably mounted to the hollow support member via the upper and lower bearing supports. A steering limiting system comprises a projection which is rotatable about a center axis of the connection member and movable within a recess. Rotation of the connection member in a first direction causes the projection to move toward a first stop surface of the recess and rotation of the connection member in a second direction causes the projection to move toward a second stop surface of the recess.

The children's vehicle is a tricycle.

The children's vehicle is a bicycle.

The first and second stop surfaces are at least partially arranged within the hollow support member.

The vehicle may further comprise a mudguard having an opening receiving therein a portion of the lower end of the connection member.

The recess is an arc-shaped recess.

The invention also provides for a children's vehicle having limited steering, comprising a hollow support member, a frame having a front end coupled to the hollow support member, an upper bearing support having a main through opening and being mounted to an upper end of the hollow support member, a lower bearing support having a main through opening and being mounted to a lower end of the hollow support member, a connection member having a lower end extending to a wheel fork and an upper end connectable to a handlebar. The connection member is rotatably mounted to the hollow support member via the upper and the lower bearing supports. A steering limiting system comprising a projection that moves with the connection member and first and second circumferentially-spaced stop surfaces. Rotation of the connection member in a first direction causes the projection to move toward the first stop surface and rotation of the connection member in a second direction causes the projection to move toward the second stop surface.

The children's vehicle is one of a bicycle and a tricycle.

The rear end of the frame is coupled to a rear axle and further comprises a seat mounted to the frame between the hollow support member and the rear axle and a mudguard arranged between the wheel fork and the lower bearing support.

The invention also provides for a children's vehicle comprising a hollow support member, a frame having a front end coupled to the hollow support member and a rear end coupled to a rear axle, a seat mounted to the frame between the hollow support member and the rear axle, an upper bearing support being mounted to an upper end of the hollow support member. The upper bearing support comprising a portion extending into the hollow support member and a portion extending outside the hollow support member. A lower bearing support is mounted to a lower end of the hollow support member. The lower bearing support comprises a portion extending into the hollow support member and a portion extending outside the hollow support member. A connection member having a lower end extending to a wheel fork and an upper end connectable to a handlebar. The connection member being rotatably mounted to the hollow support member via the upper and the lower bearing supports. A one-piece mudguard arranged between the lower bearing support and the wheel fork. The mudguard comprises an upwardly oriented projecting portion, an opening sized to receive therein a portion of the connection member, a first lateral side arranged over a first portion of the wheel fork, a second lateral side arranged over a second portion of the wheel fork, and an annular surface arranged adjacent a lower annular surface of the lower bearing support.

The vehicle may further comprises first and second circumferentially spaced stop surfaces, wherein rotation of the connection member a first direction limits steering in the first direction and rotation of the connection member in a second direction limits steering in the second direction.

The vehicle comprises a bicycle or a tricycle.

The invention also provides for a tricycle steering head comprising a support tube adapted to be fixed to a frame, an upper bearing support having a portion extending into the support tube and another portion extending outside the support tube, a lower bearing support having a portion extending into the support tube and another portion extending outside the support tube, a cylindrical member adapted to connect a wheel fork to a handlebar. The cylindrical member being rotatable with respect to the support tube. A space is arranged between first and second stop surfaces. A mudguard comprises first and second stop surfaces. Contact between the first stop surface of the mudguard and the first stop surface of the space limits the rotation of the cylindrical member in one direction, and wherein contact between the second stop surface of the mudguard and the second stop surface of the space limits the rotation of the cylindrical member in another direction.

The mudguard is a one piece mudguard that utilizes portions that engage with the wheel fork.

The space is an arc-shaped recess and the first and second stop surfaces of the mudguard are arranged on a projecting portion.

The space is arranged in the lower bearing support.

The invention also provides for a tricycle having limited steering, comprising a support tube adapted to be fixed to a frame, an upper bearing support having a portion extending into the support tube and another portion extending outside the support tube, a lower bearing support having a portion extending into the support tube and another portion extending outside the support tube, a wheel fork comprising an upper cylindrical portion that extends through openings in the upper and lower bearing supports and a lower fork portion adapted to allow mounting of a front wheel. A mudguard comprises an arc-shaped upward projecting portion configured to extend into an arc-shaped space. The projecting portion comprises at least one stop surface. Steering of the wheel fork is limited in a first direction by contact between the at least one stop surface of the projecting portion and at least one stop surface arranged in the arc-shaped space.

Steering of the wheel fork is limited in a second direction by contact between another stop surface of the projecting portion and another stop surface arranged in the arc-shaped space.

The invention also provides for a children's vehicle having limited steering, comprising a hollow support member, a frame having a front end coupled to the hollow support member and a rear end coupled to a rear axle, a seat mounted to the frame between the hollow support member and the rear axle, an upper bearing support having a main through opening and being mounted to an upper end of the hollow support member, a lower bearing support having a main through opening and being mounted to a lower end of the hollow support member, a connection member having a lower end extending to a wheel fork and an upper end connectable to a handlebar, and a steering limiting system comprising a projection which is rotatable about a center axis of the connection member and movable within a recess. Rotation of the connection member in a first direction causes the projection to move toward a first stop surface of the recess.

Each of the children's vehicle is a tricycle, the projection is arranged on a mudguard, an annular surface of the mudguard is arranged adjacent an annular surface located below the lower end of the hollow support member, and rotation of the connection member in a second direction causes the projection to move toward a second stop surface of the recess.

The recess is an arc-shaped space delimited by the first and second stop surfaces.

BRIEF DESCRIPTION OF THE DRAWINGS

The present invention is further described in the detailed description which follows, in reference to the noted plurality of drawings by way of non-limiting examples of embodiments of the present invention, in which like reference numerals represent similar parts throughout the several views of the drawings, and wherein:

FIG. 13 is a sectional view of the arrangement according to FIG. 12 along the sectional lines XIII-XIII of FIG. 12;

FIG. 14 is an enlarged side view showing a portion of the slide and of the locking element in the locked state;

FIG. 15 is a view analogous to FIG. 14, in the unlocked state;

FIG. 16 is a top view on the slide; and

FIG. 17 is a top view on the lower bearing.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
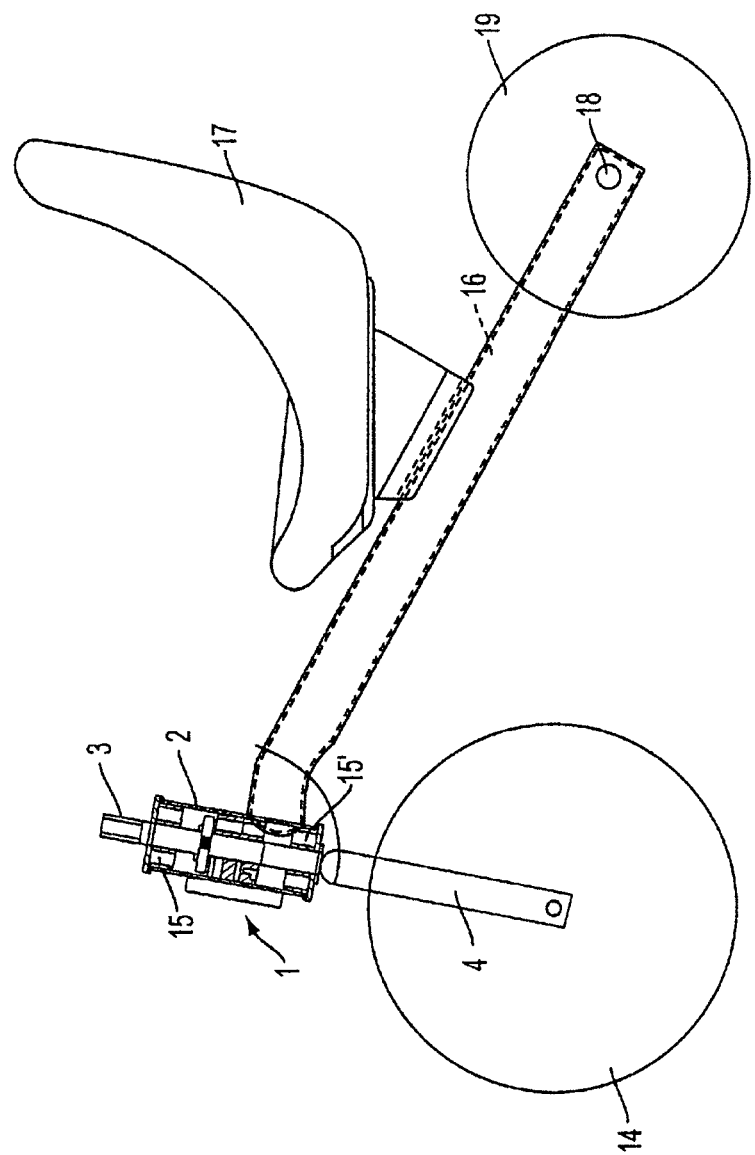
FIG. 1 is a schematic side view of a children's tricycle with one embodiment of the vehicle steering head according to the invention.

A children's tricycle is shown in FIG. 1 and comprises a front wheel 14 which is supported on a wheel fork 4. Wheel fork 4 is fixedly connected to a fork member 3. A handlebar (not shown) can be secured to the upper end of fork member 3.

Fork member 3 is supported in a support tube 2. This support is accomplished by utilizing slide bearings 15 and 15' which are shown in detail in FIGS. 2 to 5. The slide bearings 15 and 15' correspond to those of the prior art in this embodiment so that a detailed description is not needed.

Support tube 2 is firmly connected to a frame 16 which has mounted thereon a seat 17. The tricycle also has a rear axle 18 with rear wheels 19. Accordingly, a support tube 2 and a fork member 3 form a steering head 1.

Figure 6:
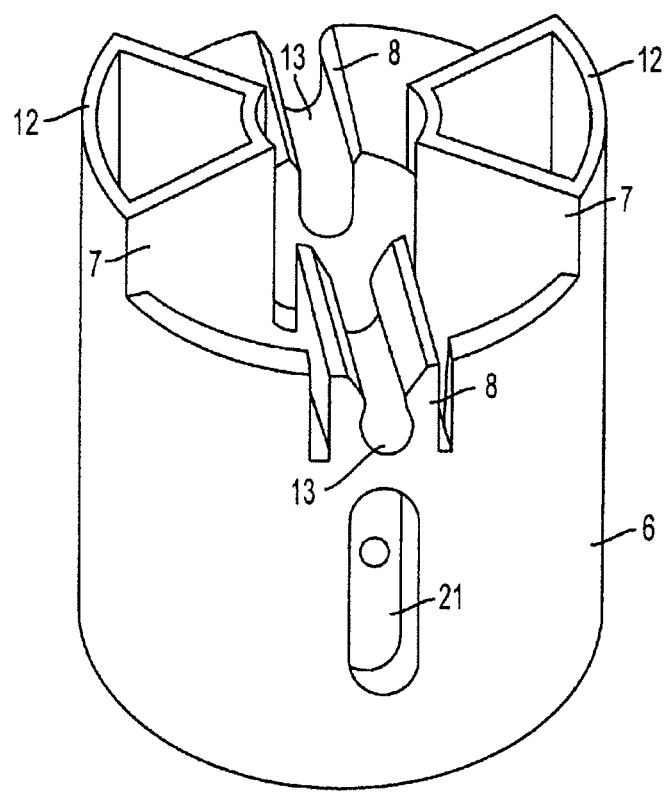
FIG. 6 is a simplified perspective illustration of the linkage element according to the invention.

According to the invention, support tube 2 has arranged therein a linkage element 6 which has a substantially cylindrical configuration (see also FIG. 6) and which is received with a play or clearance (so that it can slide) within support tube 2. Linkage element 6 is also provided with a central recess through which fork member 3 extends or passes.

Support tube 2 also has formed therein a longitudinal slot 9 through which a connection element 10 extends or passes. This connection element 10 is connected to a slide 11 and linkage element 6. The connection may be via a screw 20 (see FIGS. 2 and 4) or other conventional connecting mechanism. In the illustrated embodiment, connection element 10 is integrally connected to or formed with slide 11 and extends in a recess 21 of linkage element 6. However, connection element 10 and slide 11 may be made as separate components which are joined or secured together by any conventional attachment technique including a screw or threaded element.

On its front upper portion, linkage element 6 comprises two symmetrical opposite attachments or stops 12. Each of these stops 12 may be provided with lateral stop surfaces 7. When viewed from the top, these attachments or stops 12 are designed in a manner of a segment of a partial circle (pie shaped or wedge shaped), so that four stop surfaces 7 are formed, with each one being arranged in symmetry with one another. Of course, stops 12 may be separately formed and attached to linkage element 6 instead of being integrally formed therewith, as is shown.

In the illustrated embodiment two locking elements 8 may be utilized in which each is formed by a recess 13. These locking elements 8 are preferably provided on linkage element 6 in retracted or set back manner with respect to stops 12. As is apparent from FIG. 6, the walls of at least one recess 13 may be made resilient to ensure a releasable locking of a bolt-like latch element 5 when linkage element 6 is pushed upwards or into engagement with bolt-like latch element 5.

As is apparent from FIGS. 2 to 5, fork member 3 is provided with a bolt-like or pin-like latch element 5 which extends or projects from at least one and preferably both sides of fork member 3. Of course, latch element 5 may be integrally formed with fork member. Alternatively, latch element 5 may be a threaded or partially threaded member which threads into fork member 3. However, it is preferred that latch element 5 be a pin having a centrally disposed exterior knurl which is press fit into a fork member as is shown. In its working position, latch element 5 rotates with fork member 3 when a deflection or rotation of the handlebar takes place. The deflection of the handlebar is limited by way of latch element 5 abutting on stop surfaces 7, these stop surfaces 7 defining the limited range of motion of the handlebar.

Figure 2:
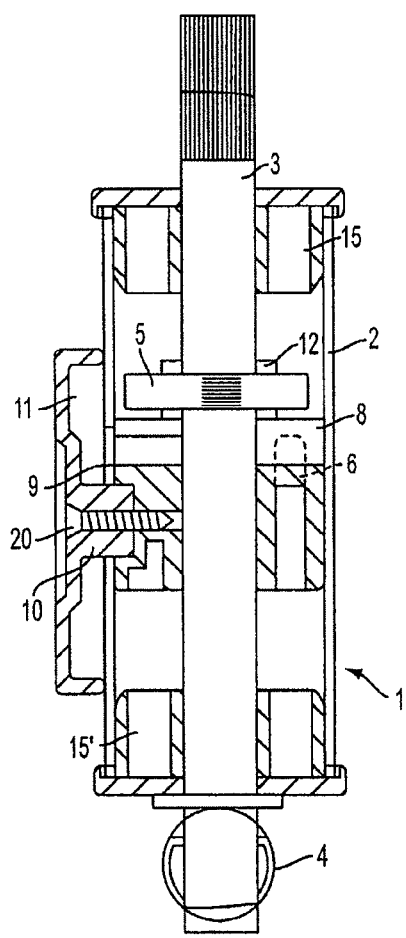
FIG. 2 is a simplified sectional side view of the steering head according to the invention in an unlocked state.
Figure 3:
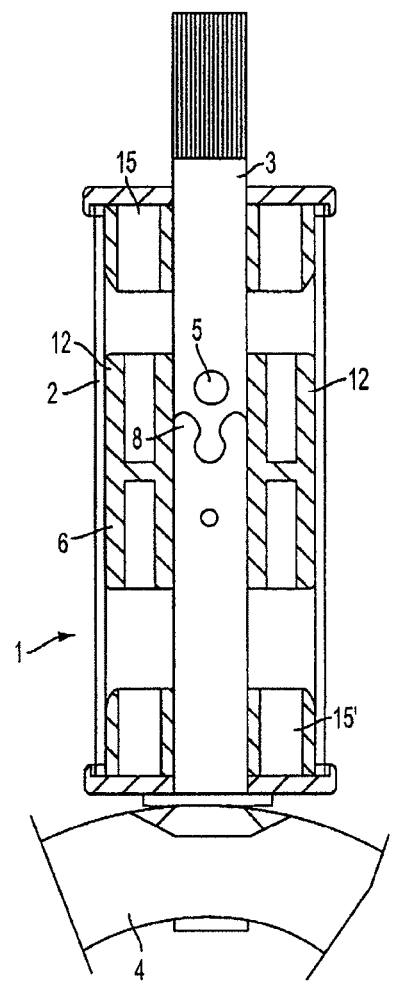
FIG. 3 is a side view, turned or oriented by 90° (a right angle) of the arrangement shown in FIG. 2.
Figure 4:
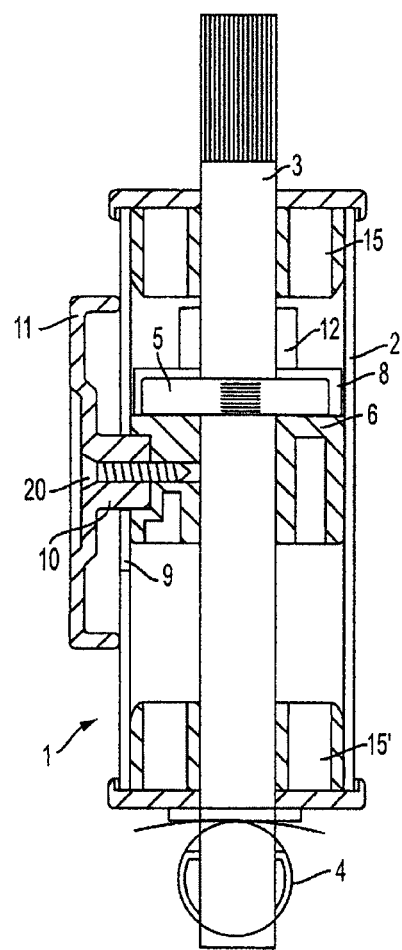
FIG. 4 is a sectional side view similar to FIG. 2, in the locked state.
Figure 5:
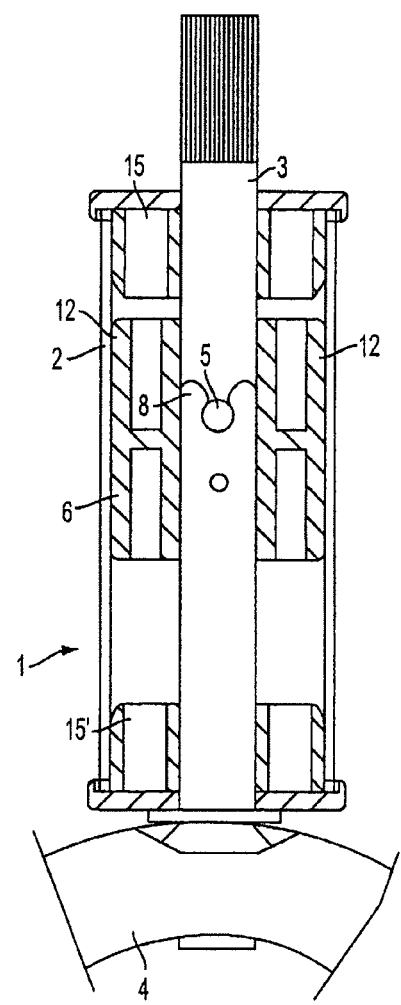
FIG. 5 is a side view, similar to FIG. 3, of the view according to FIG. 4.

When it is desired to lock the handlebar in a set position, latch element 5 is pressed or forced into recesses 13. This engagement occurs when locking element 8, which is disposed on linkage element 6, is pushed upwards by slide 11. Recesses 13 also utilize inclined inlet surfaces because they act as guiding lead-in surfaces which facilitate entry of pin 5 into recess 13. In the locked state, which is shown in FIGS. 4 and 5, a steering movement thus becomes impossible since the handlebar or fork member 3 is locked in a single direction. FIGS. 2 and 3 show a downwardly displaced condition of linkage element 6 in which latch element 5 is in a position which it does not cooperate with the locking element 8. As a result, in this position fork member 3 and handlebar are free to rotate until latch element 5 abuts on stop surfaces 7, this range of movement or rotation corresponding to a steering angle range.

According to a preferred aspect of the invention, linkage element 6 may be made from a plastic material. Of course, other materials are also contemplated.

Another embodiment of the vehicle steering head according to the invention is described with reference to FIGS. 7 to 16. In this regard, like parts are provided with like reference numerals.

Figure 7:
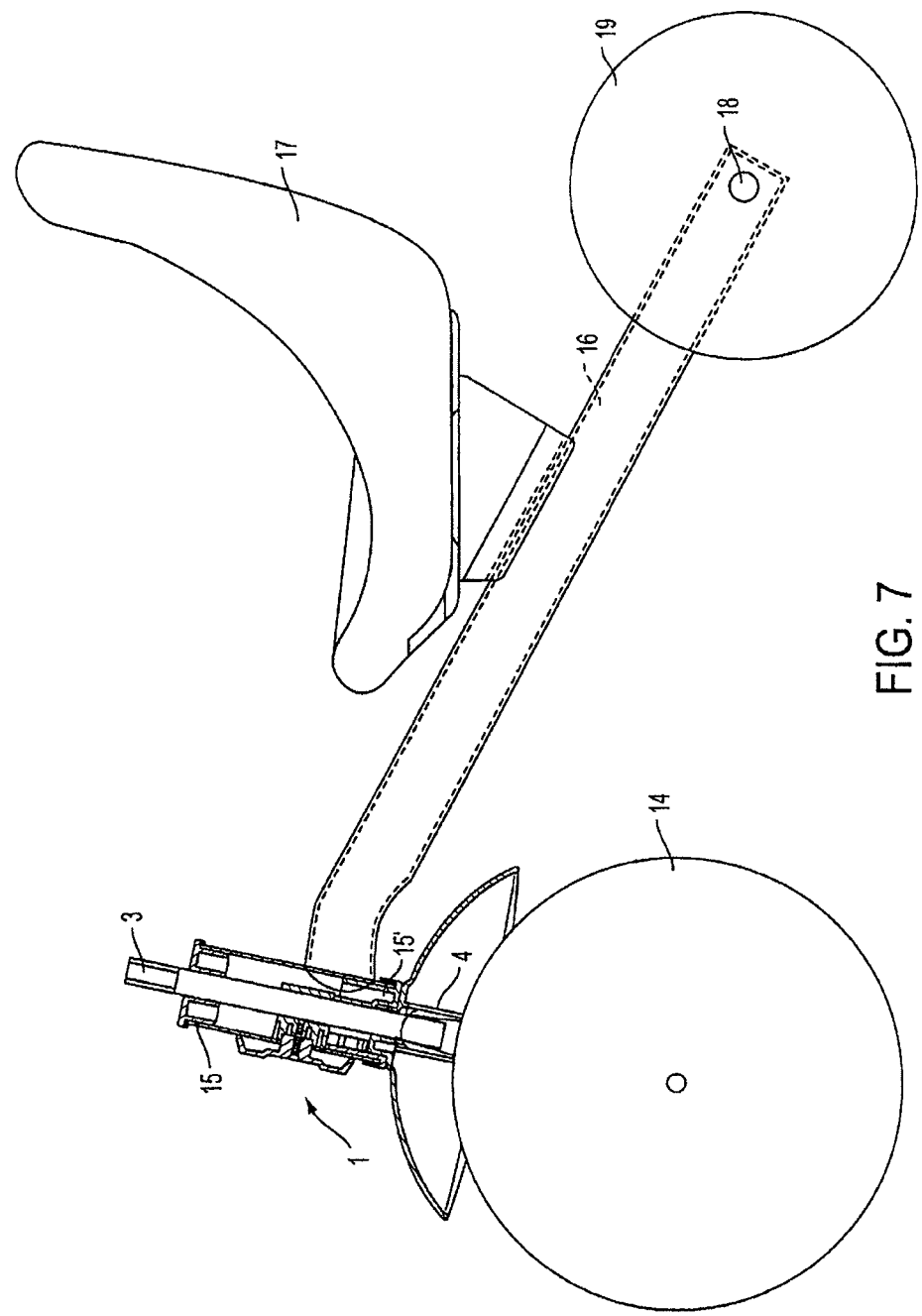
FIG. 7 is a schematic side view of a children's tricycle with another embodiment of the vehicle steering head according to the invention.
Figure 8:
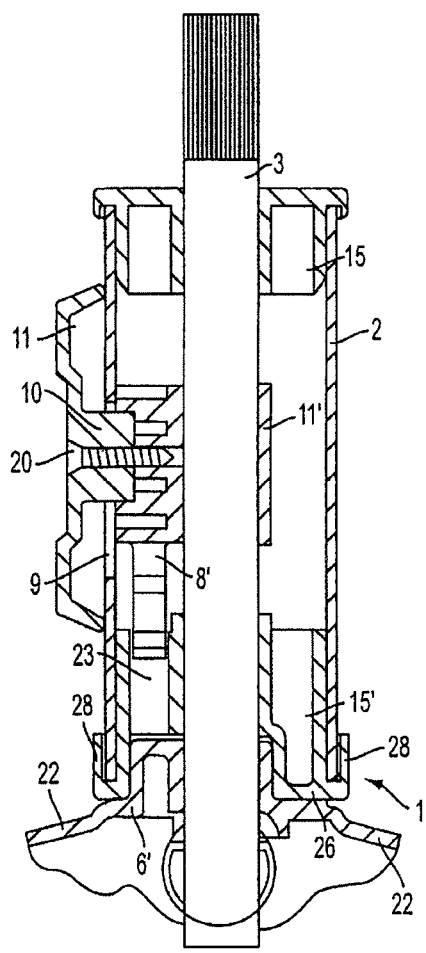
FIG. 8 is a sectional side view of the vehicle steering head according to the invention, in the unlocked state.
Figure 9:
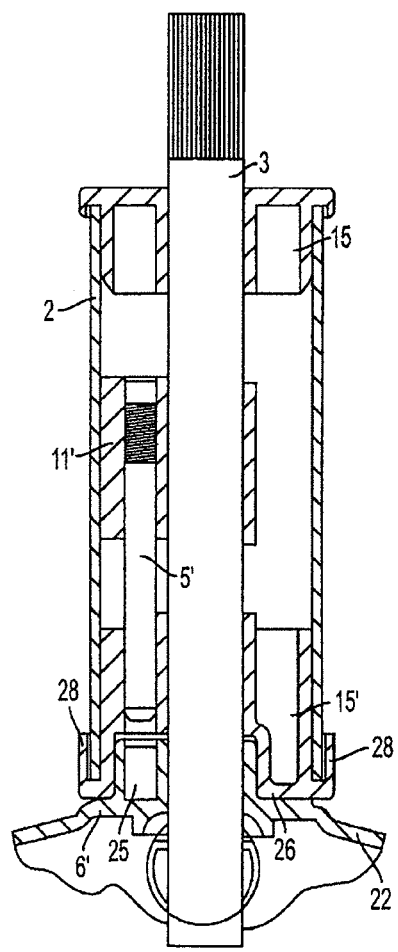
FIG. 9 is a side view, turned or oriented by 90° of the arrangement shown in FIG. 8.
Figure 10:
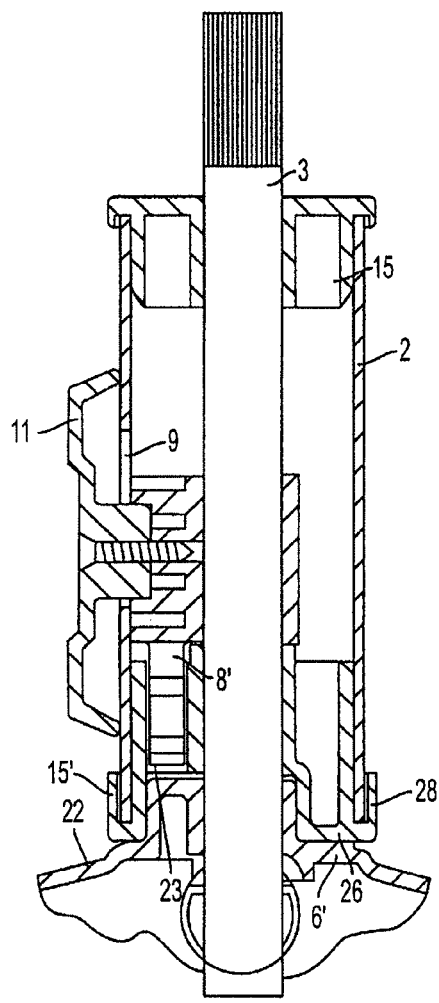
FIG. 10 is a sectional side view similar to FIG. 8, in the locked state.
Figure 11:
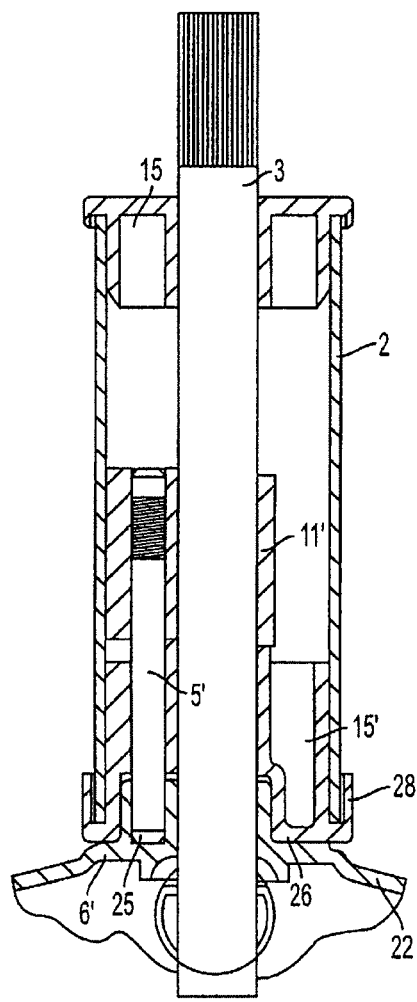
FIG. 11 is a side view, turned or oriented by 90° which is similar to FIG. 9, in the locked state.

As for the description of FIG. 7, reference can be made to the description of FIG. 1 to the extent that the same features are shown. The subsequent figures are illustrations elucidating the details which have been changed.

As in FIGS. 2 to 5, FIGS. 8 and 9 and 10 and 11, respectively, are illustrations showing the vehicle steering head on an enlarged scale. Again, like parts are here also provided with like reference numerals, so that reference can be made to the preceding explanations. Slide 11 utilizes connection element 10 and screw 20. Connection element 10 also extends through a longitudinal slot 9. Moreover, slide 11 comprises an outer grip portion 11 and an interior portion 11' which is screwed to outer grip portion 11 by a screw 20. A top view of slide 11 and 11' is shown in FIG. 16. As can be seen in this figure, a central recess 24 is provided through which fork member 3 extends or passes (with a clearance which allows slide 11' to move up and down with respect to fork member 3). Furthermore, slide 11' also has a recess (see FIGS. 9, 11 and 16) which is formed so that it can accept a bolt-like latch element 5'. Of course, this latch element 5' may be pressed into this recess, threaded into the recess, or otherwise secured to slide 11' in a suitable manner. Alternatively, latch element 5' may be integrally formed with slide 11'.

As already described in conjunction with a previous embodiment, a bearing 15 which serves as a slide bearing is used on the upper portion of steering head 1.

Lower bearing 15' in this embodiment is configured such that it has an upwardly projecting contour of a linkage element 6' which can extend into bearing 15'. Of course, the bearing and the upwardly projecting contour may be made as separate components which are joined together by conventional techniques rather than integrally formed as is shown. Additionally, as becomes apparent in FIG. 12, linkage element 6' may have a recess 25 into which latch element 5' can be inserted (see also FIGS. 9 and 11).

Figure 12:
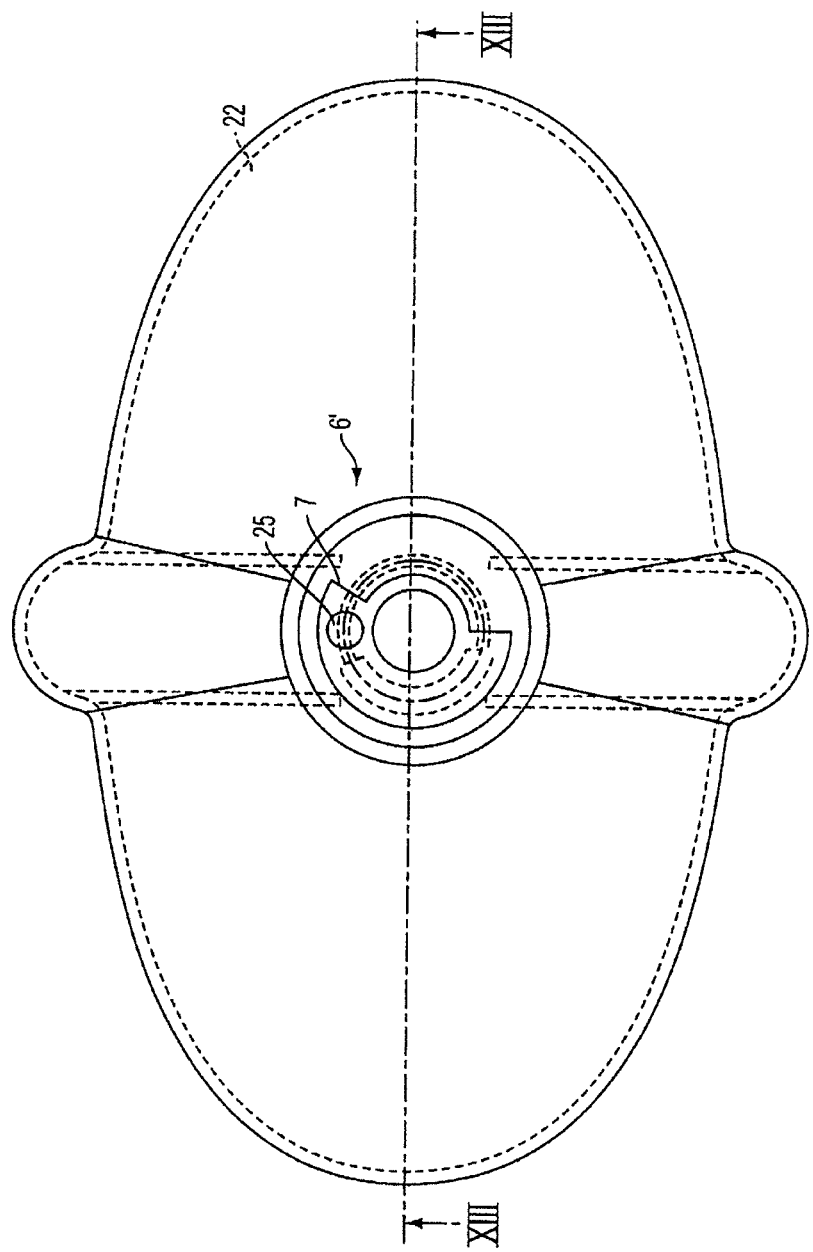
FIG. 12 is a top view on the linkage element according to the invention and on the associated mudguard.

As can further be seen from the top view of FIG. 12, linkage element 6' comprises two lateral stop surfaces 7 which are angularly spaced apart from each other. This design is such that a downwardly oriented attachment or stop 26 (see FIGS. 8 to 11) of the bearing 15', which is connected to support tube 2, forms a steering limitation of plus/minus approximately 45°. Of course, as with the previous embodiment, the range of steering limitation can be designed to any desired range.

FIG. 13 shows a lateral sectional view of mudguard 22 and of linkage element 6'. Note that these components are integrally formed as a single member which reduces manufacturing costs associated with joining two separate components.

FIGS. 14 and 15 are front views of slide 11' wherein handpiece 11 has been removed to illustrate the operation of locking element 8'. Locking element 8' is U-shaped and includes two movable or flexible lateral legs which can releasably be inserted into a recess 23 of bearing 15'. Upon insertion and locking, locking element 8' is pressed against an undercut and thereby held in position inside recess 23. Accordingly, when it is desired to release the locked state of fork member 3, slide 11' must be pushed upwards which removes the legs from recess 23. Of course, other locking mechanisms may be utilized and this embodiment is not limited to the use of this particular locking mechanism. For example, a pin may be used which has a floating ring disposed around its circumference. Alternatively, other conventional releasable locking mechanisms may be utilized.

FIG. 17 is a top view on lower bearing 15' on an enlarged scale. The (downwardly projecting) attachment or stop 26 can be seen here as can recess 23 which receives locking element 8'. Moreover, recess 27 is adapted to receive and guide bolt-like latch element 5' therein. Furthermore, a surrounding collar-like edge 28 can be seen in which 29 designates two oppositely disposed attachments or projections which serve as anti-rotation engagements. These engagements are designed to engage recesses (not shown) of support tube 2. Of course, lower bearing may be secured to support tube 2 in any conventional manner such as by bonding, welding, or screws. Moreover, this attachment may be releasable or more permanent in nature.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A tricycle with limited steering and steering lock, comprising:
   a support tube fixed to a frame;
   a connecting member rotatably mounted to the support tube via upper and lower bearing supports;
   a mechanism that limits rotational movement of the connecting member in each of two directions;
   the mechanism comprising at least two stop surfaces;
   one of the at least two stop surfaces limiting the rotation of the connecting member in one of the two directions;
   another of the at least two stop surfaces limiting the rotation of the connecting member in another of the two directions;
   a mudguard having portions that engage with a wheel fork so as to rotate with the with the wheel fork;
   a steering lock system; and a button of the steering lock system being arranged on a front side of the support tube and being movable between an unlocked position and a locked position, wherein, in the unlocked position, the connecting member is rotatable in each of the two directions, and in the locked position, the connecting member is prevented from rotating in each of the two directions.

2. The tricycle of claim 1, wherein the mudguard is a one-piece mudguard, the lower bearing support is non-rotatably mounted to the support tube and a portion of the button extends into a slot arranged on the front side of the support tube.

3. The tricycle of claim 1, wherein the button comprises a portion arranged outside the support tube and a portion that extends into an opening of the support tube.

4. The tricycle of claim 1, wherein the upper and lower bearing supports each comprises a portion extending outside the support tube and a portion extending inside the support tube.

5. The tricycle of claim 1, wherein the mechanism moves when the connecting member moves.

6. The tricycle of claim 1, wherein the mechanism comprises a projection and extends into a recess comprising two stop surfaces.

7. The tricycle of claim 6, wherein a bottom of the recess is arranged axially above a lower end of the support tube.

8. A vehicle steering head for a tricycle having a frame, the vehicle steering head comprising:
   a support tube fixed to the frame of the tricycle;
   an upper bearing support mounted to the support tube;
   a lower bearing support non-rotatably mounted to the support tube;
   a connecting element mounted to the support tube via the upper and lower bearing supports;
   a wheel fork arranged at a lower end of the connecting element;
   a mudguard arranged between the wheel fork and the lower bearing support;
   non-movable angularly spaced stop surfaces being non-axially movable;
   movable stop surfaces that are rotatable with the connecting element;
   one movable stop surface contacting one of the non-movable stop surfaces when the wheel fork is rotated in one direction and another movable stop surface contacting another of the non-movable stop surfaces when the wheel fork is rotated in another direction; and
   the upper and lower bearing supports each comprising a portion extending outside the support tube and a portion extending inside the support tube.

9. The steering head of claim 8, wherein the non-movable stop surfaces are arranged:
   between the mudguard and an upper end of the support tube; and
   between an outer surface of the connecting element and an inner surface of the support tube.

10. The steering head of claim 8, further comprising a locking system which, in a locked position, prevents rotational movement of the wheel fork and which, in an unlocked position, allows the wheel fork to rotate within an angular range.

11. The steering head of claim 8, wherein the mudguard is a one-piece mudguard arranged below the lower bearing support.

12. The steering head of claim 8, further comprising a button arranged on a front side of the support tube for activating a steering lock system, wherein the button comprises a portion arranged outside the support tube and a portion that extends into a slot of the support tube.

13. The steering head of claim 8, wherein the lower bearing support comprises the non-movable stop surfaces.

14. The steering head of claim 8, wherein the movable stop surfaces are arranged on a projection.

15. The steering head of claim 14, wherein the projection comprises an upper surface that is arranged within the support tube.

16. The steering head of claim 8, wherein the non-movable stop surfaces are arranged on an arcuate recess.

17. The steering head of claim 8, wherein the movable stop surfaces are arranged on a projection and further comprising a steering lock device having a portion that engages with the projection in a steering lock position and disengages from the projection in a steering unlock position.

18. The steering head of claim 17, wherein, in the steering lock position, the portion of the steering lock device moves parallel to an axis of the connecting element and engages with an opening of the projection.

19. A vehicle steering head for a tricycle having a frame, the vehicle steering head comprising:
   a support tube fixed to the frame of the tricycle;
   an upper bearing support mounted to the support tube;
   a lower bearing support mounted to the support tube;
   a connecting element mounted to the support tube via the upper and lower bearing supports;
   angularly spaced non-movable stop surfaces;
   movable stop surfaces that are rotatable with the connecting element;
   one movable stop surface contacting one of the non-movable stop surfaces when the connecting element is rotated in one direction and another movable stop surface contacting another of the non-movable stop surfaces when the connecting element is rotated in another direction, whereby steering is limited within an angular range;
   the upper and lower bearing supports each comprising a portion extending outside the support tube and a portion extending inside the support tube;
   the lower bearing support comprising a recess and a main central opening receiving therein a portion of the connecting element; and
   a steering lock system comprising a movable member disposed within the support tube and having a main opening that allows another portion of the connecting element to pass therethrough.

20. The steering head of claim 19, further comprising a mudguard arranged below the lower bearing support, wherein:
   the non-movable stop surfaces are arranged between the mudguard and an upper end of the support tube and between an outer surface of the connecting element and an inner surface of the support tube,
   the movable stop surfaces comprise lateral stop surfaces arranged on a projection; and
   the steering lock system is placed in a locked position, preventing rotational movement of the connecting element, via movement of a button located on a front side of the support tube.

21. A tricycle comprising:
   a hollow support tube coupled to a frame;
   upper and lower bearing supports respectively coupled to upper and lower ends of the support tube;
   a fork member having a cylindrical portion extending up through the lower bearing support and into the support tube;

a mudguard having a surface structured and arranged to contact a lower surface of the lower bearing support; and
a lock element that is movable by a user between a locked position and an unlocked position,
wherein steering rotational movement is limited in each of two opposite steering directions.

22. The tricycle of claim 21, wherein the lock element is a lock button arranged outside the support tube.

23. The tricycle of claim 21, wherein the lock element is arranged on a front side of the support tube.

24. The tricycle of claim 21, wherein the mudguard is a one-piece mudguard.

25. The tricycle of claim 21, wherein the upper and lower bearing supports each has a portion extending within the support tube and a portion arranged outside the support tube.

26. The tricycle of claim 21, wherein the mudguard comprises a projecting portion that projects upward relative to the surface of the mudguard.

27. The tricycle of claim 26, wherein the projecting portion extends into a recess formed in the lower bearing support.

28. The tricycle of claim 21, wherein the lock element can slide up and down.

29. The tricycle of claim 21, wherein the mudguard comprises a fender portion and lateral projecting portions.

30. A tricycle comprising:
a hollow support coupled to a frame;
an upper bearing support arranged at an upper end of the hollow support;
a fork member mounting a front wheel;
said fork member having a cylindrical portion extending up through the hollow support;
an upper end portion of the cylindrical portion extending out of an opening in the upper bearing support;
a mudguard having an opening through which passes a portion of the cylindrical portion;
a projection that rotates with the fork member about an axis of the cylindrical portion to move towards and away from stop surfaces; and
a recess located at a lower end of the hollow support to receive therein the projection.

31. The tricycle of claim 30, wherein rotational movement of the front wheel is limited via the projection in each of two opposite steering directions.

32. The tricycle of claim 30, wherein the mudguard is a one-piece mudguard and comprises an upper annular surface arranged below a lower end of the hollow support.

33. The tricycle of claim 30, wherein the upper bearing support has a portion extending within the hollow support and a portion arranged outside the hollow support.

34. The tricycle of claim 30, wherein the recess is an arc-shaped recess.

35. The tricycle of claim 30, wherein the mudguard comprises a fender portion and lateral projecting portions.

36. A tricycle limited steering system, comprising:
a steerable front wheel;
a hollow support tube coupled to a frame;
upper and lower bearing supports respectively coupled to upper and lower ends of the support tube;
a member extending through the support tube and having an upper portion extending out through an opening in the upper bearing support and a lower portion extending out through an opening of the lower bearing support;
a recess comprising first and second stop surfaces; and
a projection that extends into the recess;
wherein the projection and recess limit steering movement of the front wheel such that the projection and the first stop surface are engagable when the front wheel is steered in a first steering direction, and the projection and the second stop surface are engagable when the front wheel is steered in a second steering direction.

37. The tricycle of claim 36, wherein the recess is an arc-shaped recess.

38. The tricycle of claim 36, further comprising:
a surface arranged adjacent a surface of the lower bearing support; and
a portion of the projection extends into the support tube and another portion of the projection extends outside of the support tube.

39. A children's vehicle having limited steering, comprising:
a hollow support member;
a frame having a front end coupled to the hollow support member and a rear end coupled to a rear axle;
a seat mounted to the frame between the hollow support member and the rear axle;
an upper bearing support having a main through opening and being mounted to an upper end of the hollow support member;
a lower bearing support having a main through opening and being mounted to a lower end of the hollow support member;
a connection member having a lower end extending to a wheel fork and an upper end connectable to a handlebar;
the connection member being rotatably mounted to the hollow support member via the upper and lower bearing supports; and
a steering limiting system comprising a projection which is rotatable about a center axis of the connection member and movable within a recess,
wherein rotation of the connection member in a first direction causes the projection to move toward a first stop surface of the recess and rotation of the connection member in a second direction causes the projection to move toward a second stop surface of the recess.

40. The vehicle of claim 39, wherein the children's vehicle is a tricycle.

41. The vehicle of claim 39, wherein the children's vehicle is a bicycle.

42. The vehicle of claim 39, wherein the first and second stop surfaces are at least partially arranged within the hollow support member.

43. The vehicle of claim 39, further comprising a mudguard having an opening receiving therein a portion of the lower end of the connection member.

44. The vehicle of claim 39, wherein the recess is an arc-shaped recess.

45. A children's vehicle having limited steering, comprising:
a hollow support member;
a frame having a front end coupled to the hollow support member;
an upper bearing support having a main through opening and being mounted to an upper end of the hollow support member;
a lower bearing support having a main through opening and being mounted to a lower end of the hollow support member;
a connection member having a lower end extending to a wheel fork and an upper end connectable to a handlebar;
the connection member being rotatably mounted to the hollow support member via the upper and the lower bearing supports;

a steering limiting system comprising:
  a projection that moves with the connection member; and
  first and second circumferentially-spaced stop surfaces,
  wherein rotation of the connection member in a first direction causes the projection to move toward the first stop surface and rotation of the connection member in a second direction causes the projection to move toward the second stop surface.

46. The vehicle of claim 45, wherein the children's vehicle is one of:
  a bicycle; and
  a tricycle.

47. The vehicle of claim 45, wherein a rear end of the frame is coupled to a rear axle and further comprising:
  a seat mounted to the frame between the hollow support member and the rear axle; and
  a mudguard arranged between the wheel fork and the lower bearing support.

48. A children's vehicle comprising:
  a hollow support member;
  a frame having a front end coupled to the hollow support member and a rear end coupled to a rear axle;
  a seat mounted to the frame between the hollow support member and the rear axle;
  an upper bearing support being mounted to an upper end of the hollow support member;
  the upper bearing support comprising a portion extending into the hollow support member and a portion extending outside the hollow support member;
  a lower bearing support being mounted to a lower end of the hollow support member;
  the lower bearing support comprising a portion extending into the hollow support member and a portion extending outside the hollow support member;
  a connection member having a lower end extending to a wheel fork and an upper end connectable to a handlebar;
  the connection member being rotatably mounted to the hollow support member via the upper and the lower bearing supports;
  a one-piece mudguard arranged between the lower bearing support and the wheel fork; and
  the mudguard comprising:
    an upwardly oriented projecting portion;
    an opening sized to receive therein a portion of the connection member;
    a first lateral side arranged over a first portion of the wheel fork;
    a second lateral side arranged over a second portion of the wheel fork; and
    an annular surface arranged adjacent a lower annular surface of the lower bearing support.

49. The vehicle of claim 48, further comprising:
  first and second circumferentially spaced stop surfaces,
  wherein rotation of the connection member a first direction limits steering in the first direction and rotation of the connection member in a second direction limits steering in the second direction.

50. The vehicle of claim 48, wherein the vehicle comprises a bicycle or a tricycle.

51. A tricycle steering head comprising:
  a support tube adapted to be fixed to a frame;
  an upper bearing support having a portion extending into the support tube and another portion extending outside the support tube;
  a lower bearing support having a portion extending into the support tube and another portion extending outside the support tube;
  a cylindrical member adapted to connect a wheel fork to a handlebar;
  the cylindrical member being rotatable with respect to the support tube;
  a space arranged between first and second stop surfaces;
  a mudguard comprising first and second stop surfaces;
  wherein contact between the first stop surface of the mudguard and the first stop surface of the space limits the rotation of the cylindrical member in one direction, and wherein contact between the second stop surface of the mudguard and the second stop surface of the space limits the rotation of the cylindrical member in another direction.

52. The tricycle steering head of claim 51, wherein the mudguard is a one piece mudguard that utilizes portions that engage with the wheel fork.

53. The tricycle steering head of claim 51, wherein the space is an arc-shaped recess and the first and second stop surfaces of the mudguard are arranged on a projecting portion.

54. The tricycle steering head of claim 51, wherein the space is arranged in the lower bearing support.

55. A tricycle having limited steering, comprising:
  a support tube adapted to be fixed to a frame;
  an upper bearing support having a portion extending into the support tube and another portion extending outside the support tube;
  a lower bearing support having a portion extending into the support tube and another portion extending outside the support tube;
  a wheel fork comprising:
    an upper cylindrical portion that extends through openings in the upper and lower bearing supports; and
    a lower fork portion adapted to allow mounting of a front wheel;
  a mudguard comprising an arc-shaped upward projecting portion configured to extend into an arc-shaped space; and
  the projecting portion comprising at least one stop surface,
  wherein steering of the wheel fork is limited in a first direction by contact between the at least one stop surface of the projecting portion and at least one stop surface arranged in the arc-shaped space.

56. The tricycle of claim 55, wherein steering of the wheel fork is limited in a second direction by contact between another stop surface of the projecting portion and another stop surface arranged in the arc-shaped space.

57. A children's vehicle having limited steering, comprising:
  a hollow support member;
  a frame having a front end coupled to the hollow support member and a rear end coupled to a rear axle;
  a seat mounted to the frame between the hollow support member and the rear axle;
  an upper bearing support having a main through opening and being mounted to an upper end of the hollow support member;
  a lower bearing support having a main through opening and being mounted to a lower end of the hollow support member;
  a connection member having a lower end extending to a wheel fork and an upper end connectable to a handlebar; and a steering limiting system comprising a projection which is rotatable about a center axis of the connection member and movable within a recess, wherein rotation of the connection member in a first direction causes the projection to move toward a first stop surface of the recess.

58. The vehicle of claim 57, wherein each of:

the children's vehicle is a tricycle;

the projection is arranged on a mudguard;

an annular surface of the mudguard is arranged adjacent an annular surface located below the lower end of the hollow support member; and rotation of the connection member in a second direction causes the projection to move toward a second stop surface of the recess.

59. The vehicle of claim 58, wherein the recess is an arc-shaped space delimited by the first and second stop surfaces.

* * * * *